T. R. TIMBY.
Attachment for Cooking Stove.
No. 168,809. Patented Oct. 11, 1875.
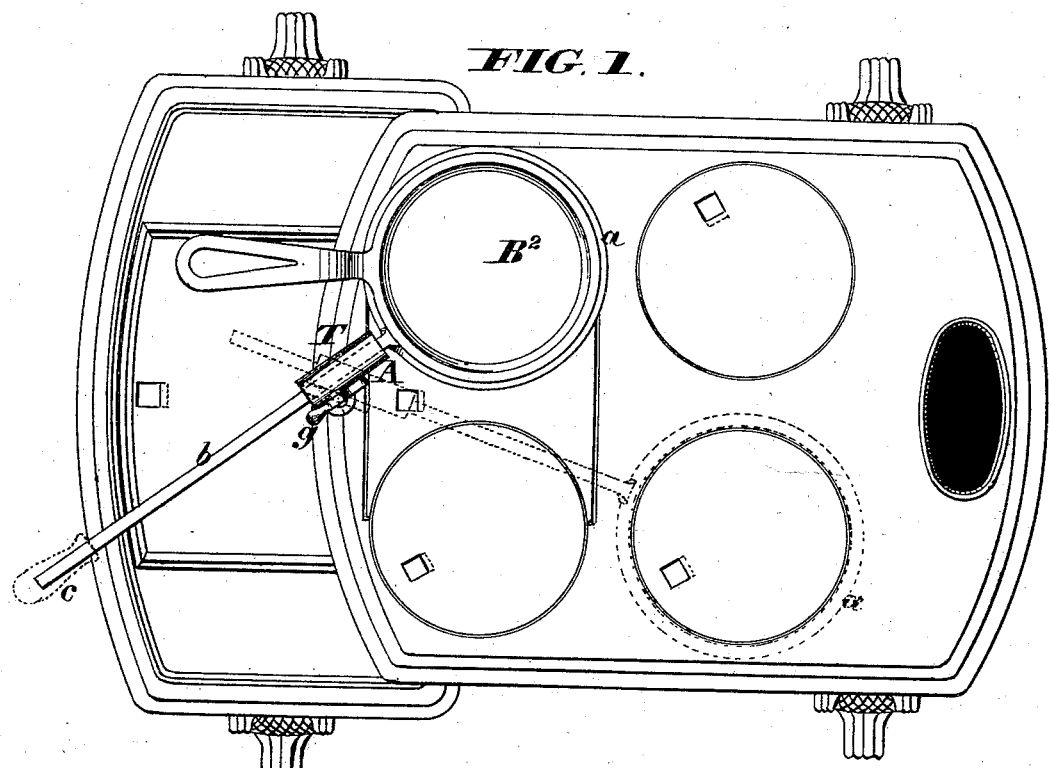
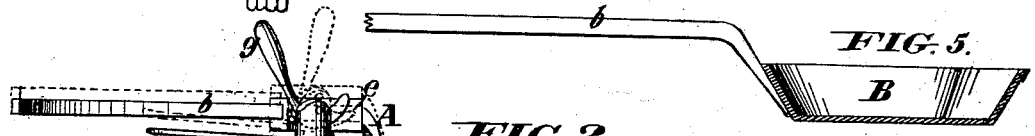
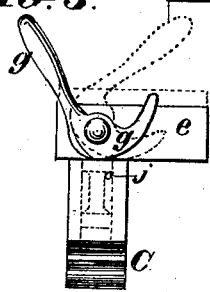
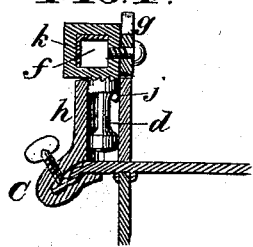
WITNESSES
Chas J. Gooch
Walter Allen
INVENTOR
Theodore R. Timby
By Knight Bros, Attorneys

UNITED STATES PATENT OFFICE.

THEODORE R. TIMBY, OF TARRYTOWN, NEW YORK.

IMPROVEMENT IN ATTACHMENTS FOR COOKING-STOVES.

Specification forming part of Letters Patent No. 168,809, dated October 11, 1875; application filed September 18, 1875.

*To all whom it may concern:*

Be it known that I, THEODORE R. TIMBY, of Tarrytown, in the county of Westchester and State of New York, have invented a new and useful Attachment for Cooking Stoves and Ranges, of which the following is a specification:

The object of this invention is to provide simple and efficient means for moving a griddle or other cooking utensil from place to place, as from one hole to another, on the top of a cooking stove or range, so as to render the utensil hotter or cooler, and for temporarily supporting the same in an elevated position, or entirely off the stove or range when this is desired, without the exertion and movement which this has hitherto involved, and with less exposure to heat.

The invention consists, first, in a swinging cooking utensil, or a swinging holder for griddles or other articles of stove or range ware, the same having a pivotal support, which is or may be applied to the stove or range. The invention consists, secondly, in a cooking utensil, or a holder for cooking utensils, having a handle of square or equivalent shape in cross-section, in combination with a support having a horizontal guide-orifice, through which this can slide back and forth, and a vertical pivot, on which it can turn from side to side. The invention consists, thirdly, in a telescopic support having a horizontal guide-orifice and a vertical pivot, (either or both,) and a lifter, in combination with the handle of the holder or cooking utensil, for raising and lowering the latter. The invention consists, fourthly, in the combination of a pivot attached to the stove or range, a rotary head mounted thereon, and constructed with a horizontal guide-orifice, an interposed lifter engaging with the stationary pivot, and a handle which is non-circular in cross-section, attached to a cooking utensil, or to a ring for holding a cooking utensil, as hereinafter more particularly described.

The attachment may be permanent or removable, and admits of modification in details.

Figure 1 is a plan view of a cooking-stove provided with an attachment illustrating this invention. Fig. 2 is a partial side elevation of the same. Fig. 3 is a side elevation of a support illustrating modifications. Fig. 4 is a vertical section on the line 4 4, Fig. 3. Fig. 5 is a sectional view of a skillet or pan adapted to be used in the place of the holder represented in Figs. 1 and 2.

Like letters of reference indicate corresponding parts in the several figures.

This attachment for cooking stoves and ranges consists of a holder, A, or one or more articles, B, of stove or range ware, and a support, T, therefor—the latter applied to the stove or range. The holder A has a flat ring, $a$, adapted to receive and hold an ordinary griddle or pan, $B^2$, or any other article of stove or range ware, over a pot-hole, or in any other place, with a long handle, $b$, the main portion of which is horizontal, of uniform diameter, and square in cross-section. This is connected to the ring by a downward bend, and may terminate in a non-conducting handle, $c$, as indicated in dotted lines in Fig. 1. Each special cooking utensil is simply constructed with a handle, $b$, of the same form as that of the holder A, instead of an ordinary handle.

The preferred construction of the support T and its attaching devices as applied to new stoves and ranges is illustrated in Figs. 1 and 2. A vertical hole is drilled through the projecting edge of the top plate at front, as shown, or else at one side, and a smaller horizontal hole is drilled beneath this in the front plate or side plate. The latter accommodates an attaching-rivet, and together they support a vertical pivot, $d$, which projects above the top of the stove or range, and receives the other member of the support—namely, a rotary head, $e$. This has a long neck to embrace the pivot, and a horizontal portion constructed with a guide-orifice, $f$, fitting the handle $b$, which slides back and forth therethrough, and turns horizontally on the pivot $d$. Provision is thus made for moving the cooking utensil from one pot-hole to another, or to intermediate points, where it may be hotter or cooler, or entirely off the stove or range in front or on either side, as illustrated in Fig. 1 by dotted lines. The non-circular shape of the handle and guide-orifice prevents lateral tipping, and the elongation of the head, as shown, prevents material sagging. The neck is placed a little to one side, and a cam-shaped lifter, $g$, is thus accommodated above the pivot $d$, which is constructed so as to permit a vertical movement of the head $e$. The lifter is pivoted in the head, and when turned, as represented in dotted lines in Fig. 2, a notch near its extremity engages with the top of the pivot, and the head and the holder or utensil are supported in elevated position, so as to cool the latter, or to free it for its movements from place to place.

Instead of being a permanent attachment, the support T may be provided with a clamp, C, consisting of a fixed jaw and a set-screw, or their equivalents, as illustrated in Figs. 3 and 4, so as to be adapted to be readily attached to stoves and ranges already in use, and so as to be applied in any preferred position. The pivot $d$ may also be attached to the rotary head, instead of being made stationary, if preferred. As shown in Figs. 3 and 4, a neck or sleeve, $h$, is formed on the clamp, and the lifter $g$ engages with the upper end of this. In the first form, Figs. 1 and 2, the base $i$, which is riveted to the stove, might obviously constitute a step, and the pivot be inverted and rotary. In this case the lifter could engage with the top of the stove.

The vertical displacement of the head of the support can be prevented by a stop-pin, $j$, and the guide-orifice $f$ be provided with a lining, $k$, of a different metal, to reduce friction, as also illustrated in Figs. 3 and 4.

The following is claimed as new, namely:

1. A swinging cooking utensil or swinging holder for griddles or other articles of stove or range ware, having a pivotal and vertically-adjustable support, substantially as herein illustrated and described.

2. A cooking utensil, or a holder for cooking utensils, having a handle, $b$, which is non-circular in cross-section, in combination with a support, T, having a vertical pivot, $d$, on which the handle can turn horizontally, and a guide-orifice, $f$, through which it can slide back and forth, for the purpose set forth.

3. The support T, having a movable head, $e$, and a lifter, $g$, for elevating the same, in combination with the holder or cooking utensil having a handle, $b$, non-circular in cross-section, as described, for the purpose specified.

4. The combination of a pivot, $d$, attached to the stove or range, a rotary head, $e$, mounted thereon, and constructed with a horizontal guide-orifice, $f$, an interposed lifter, $g$, engaging with the stationary pivot, and a handle, $b$, which is non-circular in cross-section, substantially as shown in Figs. 1 and 2, for the purpose specified.

THEODORE R. TIMBY.

Witnesses:
A. LUETGENS,
JAS. L. EWIN.